US009862341B2

(12) United States Patent
Ram

(10) Patent No.: US 9,862,341 B2
(45) Date of Patent: Jan. 9, 2018

(54) TWO-WHEELER AIRBAG SYSTEM

(71) Applicant: Nitin Govind Ram, Gurgaon (IN)

(72) Inventor: Nitin Govind Ram, Gurgaon (IN)

( * ) Notice: Subject to any disclaimer, the term of this patent is extended or adjusted under 35 U.S.C. 154(b) by 0 days.

(21) Appl. No.: 14/735,041

(22) Filed: Jun. 9, 2015

(65) Prior Publication Data
US 2015/0353047 A1    Dec. 10, 2015

(30) Foreign Application Priority Data

Jun. 9, 2014    (IN) ........................... 1546/DEL/2014

(51) Int. Cl.
| | |
|---|---|
| *B60R 21/20* | (2011.01) |
| *B60R 21/0132* | (2006.01) |
| *B62J 27/00* | (2006.01) |
| *B60R 21/231* | (2011.01) |
| *B60R 21/013* | (2006.01) |
| *B60R 21/00* | (2006.01) |

(52) U.S. Cl.
CPC .......... *B60R 21/0132* (2013.01); *B60R 21/20* (2013.01); *B62J 27/00* (2013.01); *B60R 2021/0088* (2013.01); *B60R 2021/01306* (2013.01); *B60R 2021/23169* (2013.01); *B60R 2021/23176* (2013.01)

(58) Field of Classification Search
CPC .. B60R 2021/0088; B60R 2021/23169; B60R 20/0132; B60R 21/20; B60R 2021/01306; B60R 2021/23176; B01J 27/00
USPC ..................................................... 280/730.1
See application file for complete search history.

(56) References Cited

U.S. PATENT DOCUMENTS 5,825,284 A * 10/1998 Dunwoody ........ B60G 17/0162
340/438
7,344,151 B2 * 3/2008 Sonoda ................... B60R 21/16
280/730.1

(Continued)

FOREIGN PATENT DOCUMENTS

DE        3031141 A1 *  2/1982 .............. B62J 27/00

OTHER PUBLICATIONS

K.H. Schimmelpfennig DE 00303 1141, English Machine Translation. Patented Feb. 1982, translated Nov. 15, 2016.*

*Primary Examiner* — Karen Beck
(74) *Attorney, Agent, or Firm* — Rogers Towers PA; Joseph P. Kincart

(57) ABSTRACT

The present invention provides an airbag apparatus for a two-wheeler vehicle. The airbag apparatus includes at least one front airbag mounted near each leg of a rider of the two-wheeler vehicle, the at least one front airbag to be deployed and inflated for protecting the knees, legs and feet of the rider during emergency conditions. Further, the airbag apparatus includes at least one rear airbag mounted near each leg of a pillion rider of the two-wheeler vehicle, the at least one rear airbag to be deployed and inflated for protecting the knees, legs and feet of the pillion rider during emergency conditions. Yet further, the airbag apparatus includes at least one inflator configured to supply inflation gas to the at least one front airbag and the at least one rear airbag when activated. Finally, the airbag apparatus includes at least one sensor configured to track at least one safety parameter of the two-wheeler vehicle and activate the inflator, when a predetermined threshold of the at least one safety parameter is reached.

16 Claims, 12 Drawing Sheets

(56) References Cited

U.S. PATENT DOCUMENTS

| | | | | |
|---|---|---|---|---|
| 7,350,802 B2 * | 4/2008 | Yatagai | ............... | B60R 21/23 280/730.1 |
| 7,530,594 B2 * | 5/2009 | Sonoda | ............... | B60R 21/16 280/730.1 |
| 2002/0113417 A1 * | 8/2002 | Mattes | ............. | A41D 13/018 280/730.1 |
| 2005/0127646 A1 * | 6/2005 | Kobayashi | .......... | B60R 19/205 280/730.2 |
| 2005/0236817 A1 * | 10/2005 | Sonoda | ............... | B60R 21/16 280/730.1 |
| 2006/0043712 A1 * | 3/2006 | Hakki | ............... | B60R 19/205 280/735 |
| 2006/0048989 A1 * | 3/2006 | Tsunoda | ............ | B60R 21/04 180/219 |
| 2008/0300754 A1 * | 12/2008 | Lin | ................. | B60R 21/0132 701/46 |
| 2009/0127835 A1 * | 5/2009 | Lin | ................. | A41D 13/018 280/730.1 |
| 2014/0230135 A1 * | 8/2014 | Fenyves | ........... | A41D 13/018 2/455 |
| 2015/0353047 A1 * | 12/2015 | Ram | ................. | B60R 21/20 280/730.1 |

* cited by examiner

TWO-WHEELER AIRBAG SYSTEM

TECHNICAL FIELD

The present invention relates to an airbag system to be mounted on a two-wheeler vehicle.

BACKGROUND OF THE INVENTION

Airbag modules for two-wheeler vehicles have recently been developed. When it is detected that there has been an impact, the airbag module inflates and deploys an airbag, which is responsible for mitigating the impact suffered by the rider. Most of these airbags protect riders in case of front collision.

However, skidding is one of the major causes of two-wheeler accidents. The rider is not protected during skidding. The causes of skidding include sharp turns, unbanked turns, obstacle such as pebbles, water, oil spills etc., sudden side traffic and pedestrians or pets crossing the road. Most of these causes are beyond a rider's control, so many a times skidding is inevitable. In a skidding accident, the body parts that are most vulnerable to getting hurt are the legs, the feet and the knees. Apart from the impact, the rider and pillion rider also get dragged along with the two-wheeler vehicle till the vehicle and riders lose their momentum. The chances of getting leg trapped and dragged is also high in case of such an incident. This can cause severe injury to the rider. Therefore, there is a need to protect riders when two-wheeler vehicles skid.

SUMMARY OF THE INVENTION

The present invention provides an airbag apparatus for a two-wheeler vehicle. The airbag apparatus includes at least one front airbag mounted near each leg of a rider of the two-wheeler vehicle, the at least one front airbag to be deployed and inflated for protecting the knees, legs and feet of the rider during emergency conditions. Further, the airbag apparatus includes at least one rear airbag mounted near each leg of a pillion rider of the two-wheeler vehicle, the at least one rear airbag to be deployed and inflated for protecting the knees, legs and feet of the pillion rider during emergency conditions. Yet further, the airbag apparatus includes at least one inflator configured to supply inflation gas to the at least one front airbag and the at least one rear airbag when activated. Finally, the airbag apparatus includes at least one sensor configured to track at least one safety parameter of the two-wheeler vehicle and activate the inflator, when a predetermined threshold of the at least one safety parameter is reached.

In some embodiments, the at least one inflator includes a trigger mechanism and one of a gas cartridge storing compressed gas and a chemical cartridge storing one or more chemicals capable of generating gas through a chemical reaction.

In further embodiments, the at least one sensor is a tilt sensor that activates the at least one inflator, when a tilt of the two-wheeler vehicle exceeds a predetermined threshold, wherein the at least one front airbag and the at least one rear airbag is inflated based on the direction of tilt determined by the tilt sensor.

In some further embodiments, the at least one sensor includes an impact sensor that detects a collision and activates the at least one inflator, when a detection value of the impact sensor is greater than a predetermined threshold, wherein all airbags in the at least one front airbag and the at least one rear airbag are inflated when the impact sensor detects a collision.

In another related aspect of the present invention, a method to deploy an airbag for a two-wheeler vehicle, the two-wheeler vehicle includes at least one front airbag mounted near each leg of a rider of the two-wheeler vehicle and at least one rear airbag mounted near each leg of a pillion rider of the two-wheeler vehicle. The method comprising first detecting an emergency condition, using at least one sensor configured to track at least one safety parameter of the two-wheeler vehicle. Next, the method includes sending a trigger signal, when a predetermined threshold of the at least one safety parameter is reached. Then, the method includes activating at least one inflator configured to supply inflation gas to the at least one front airbag and the at least one rear airbag when the trigger signal is received. Finally, the method includes deploying at least one of the at least one front airbag and the at least one rear airbag.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

As presented herein, various embodiments of the present invention will be described, followed by some specific examples of various components that can be utilized to implement the embodiments. The following drawings facilitate the description of some embodiments of the present invention.

DETAILED DESCRIPTION OF PREFERRED EMBODIMENTS

Figure 1:
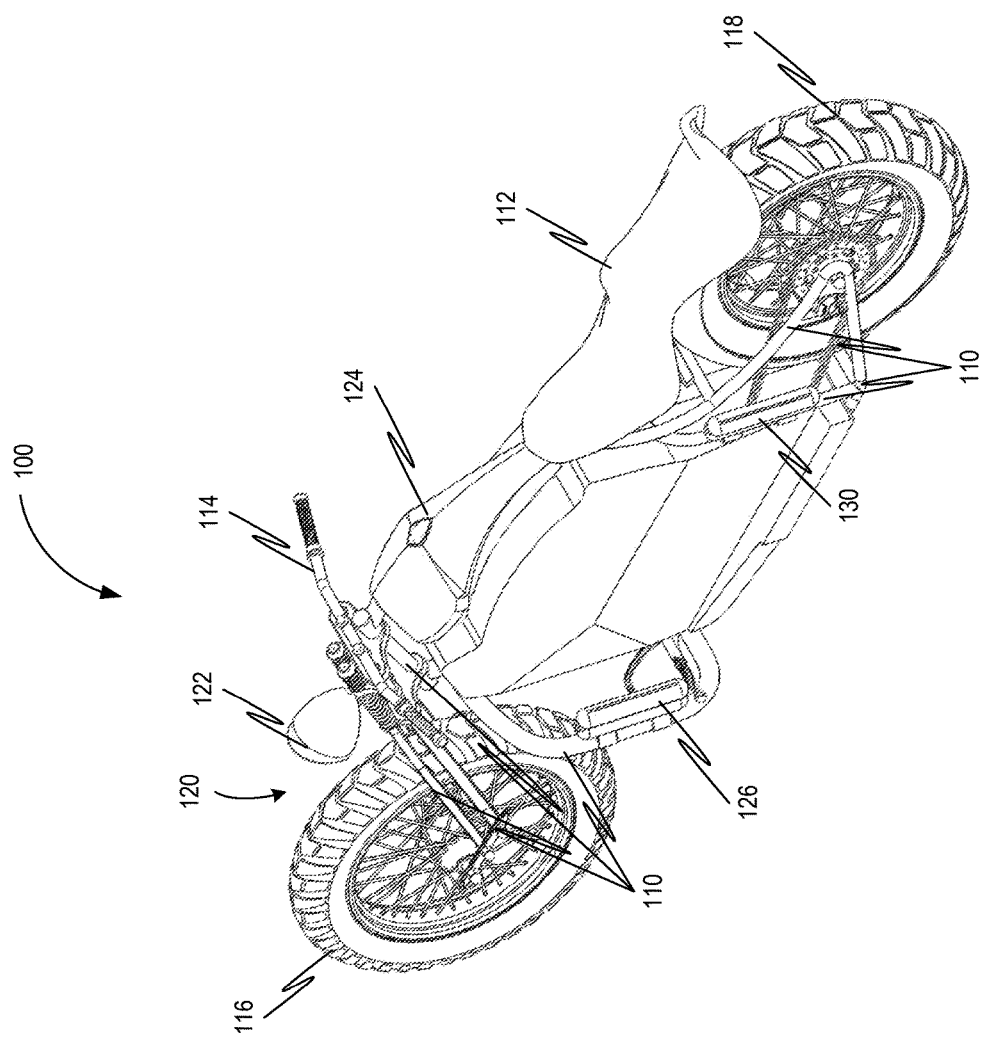
FIG. 1 is an isometric view of a two-wheeler vehicle, according to an embodiment of the invention.
Figure 2:
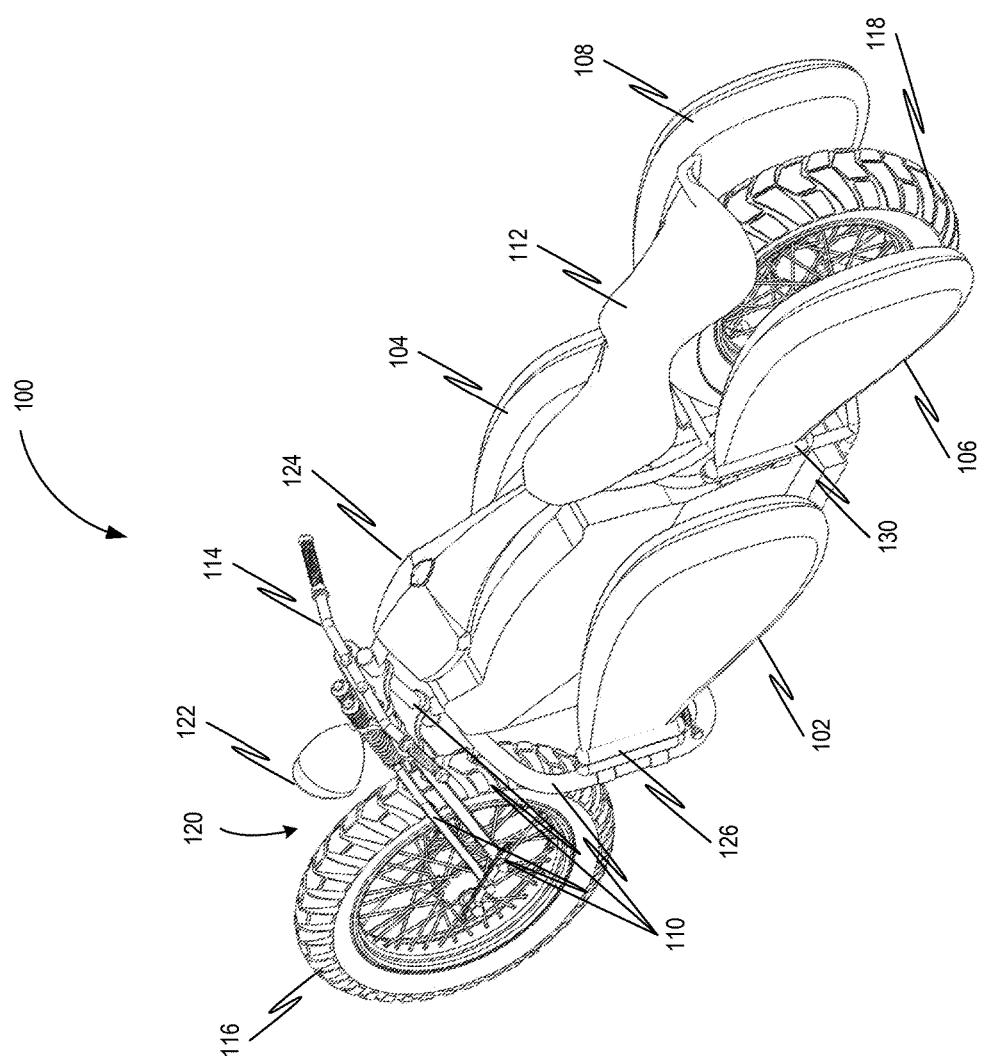
FIG. 2 is an isometric view of the two-wheeler vehicle, when the airbag of the embodiment is fully deployed.

The present invention will be further illustrated with examples below. Referring first to FIGS. 1 and 2, the entire structure of a two-wheeler vehicle 100 will be described. FIGS. 1 and 2 show an isometric view of the two-wheeler vehicle 100 according to an embodiment of the invention, to which an airbag system is mounted. FIG. 2 shows fully deployed front airbags 102-104 and rear airbags 106-108.

The two-wheeler vehicle 100 of the embodiment is a motorcycle. However, the two-wheeler vehicle may be a bicycle, a scooter or any similar vehicle.

As shown in FIGS. 1 and 2, the two-wheeler vehicle 100 is composed of a body frame 110 including an engine and a main frame; a seat 112 that a rider and pillion rider can straddle; a handlebar 114; a front wheel 116 and a rear wheel 118. A front part 120 of the body frame 110 at the front of the vehicle has a headlight 122, various meters, switches, a windshield and so on. A fuel tank 124 is disposed in front of a vehicle between the seat 112 and the front part 120. When the airbag 102 is not deployed, it is housed in a retainer 126. Similarly, the airbag 104 is housed in a retainer 128, the airbag 106 is housed in a retainer 130 and the airbag 108 is housed in a retainer 132. The retainers 126-132 may be part of the frame 110 of the two-wheeler vehicle 100. Alternatively, the retainers 126-132 may be additional components mounted on the frame 110 of the two-wheeler vehicle 100. The airbags 102-108 are made of the same material as that of car airbags. The retainers 126-132 provide housing for the airbags 102-108 respectively in a predetermined folded state. The retainers 126-132 may also house inflators to deploy the airbags 102-108. The retainers for airbags are well known in the art.

Figure 3:
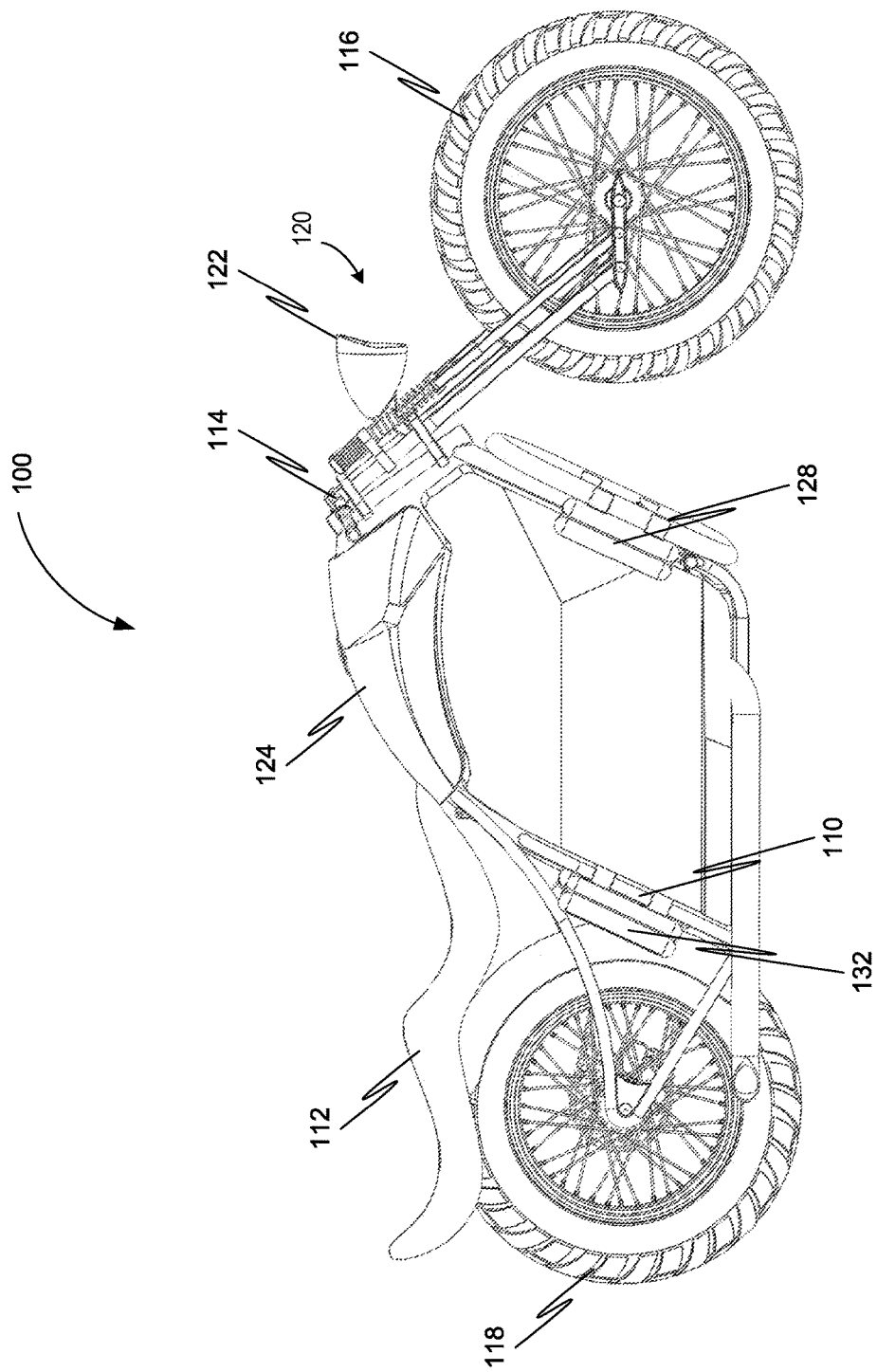
FIG. 3 is a side view of the two-wheeler vehicle in FIG. 1.
Figure 4:
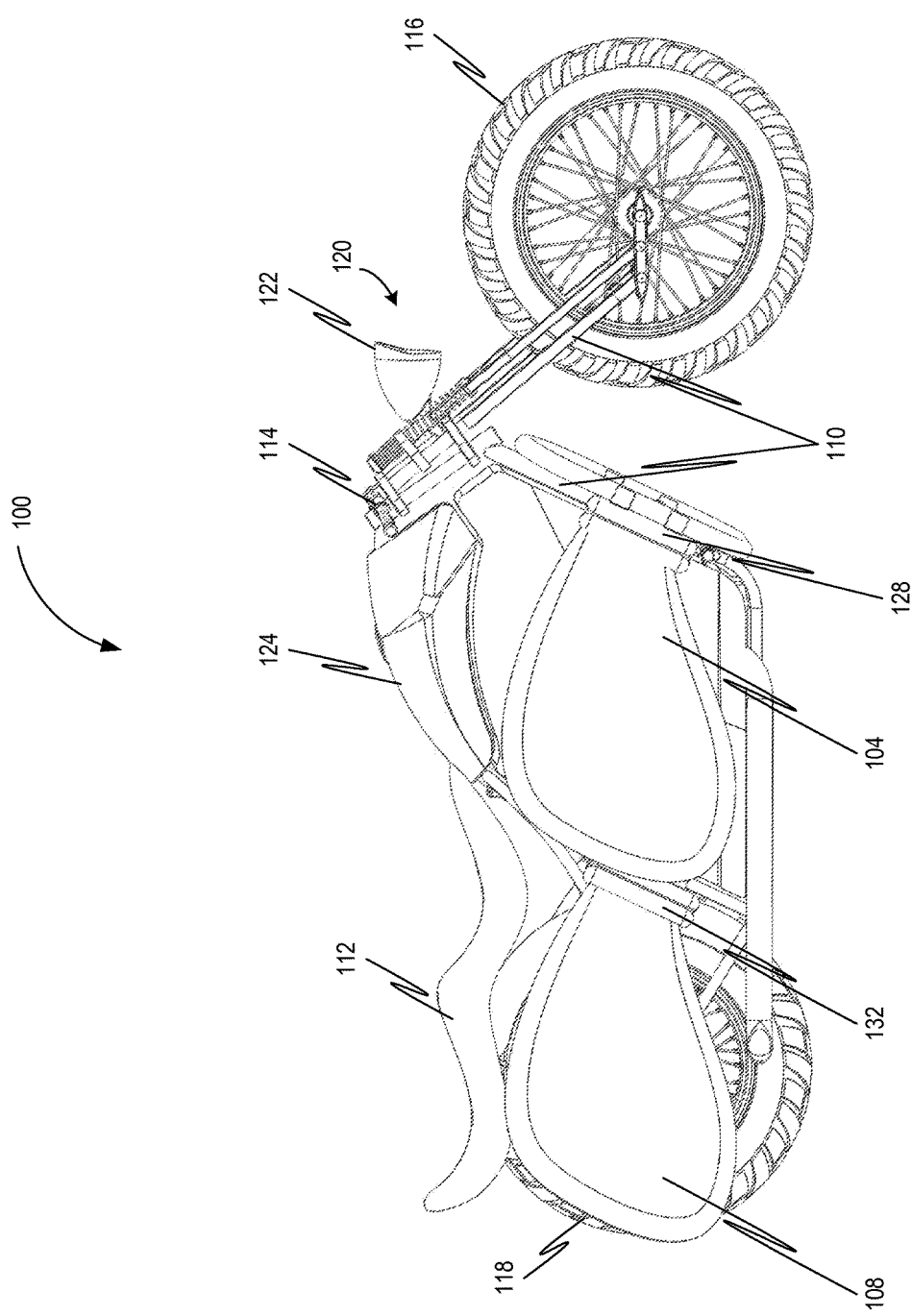
FIG. 4 is a side view of the two-wheeler vehicle in FIG. 1, when the airbag of the embodiment is fully deployed.
Figure 5:
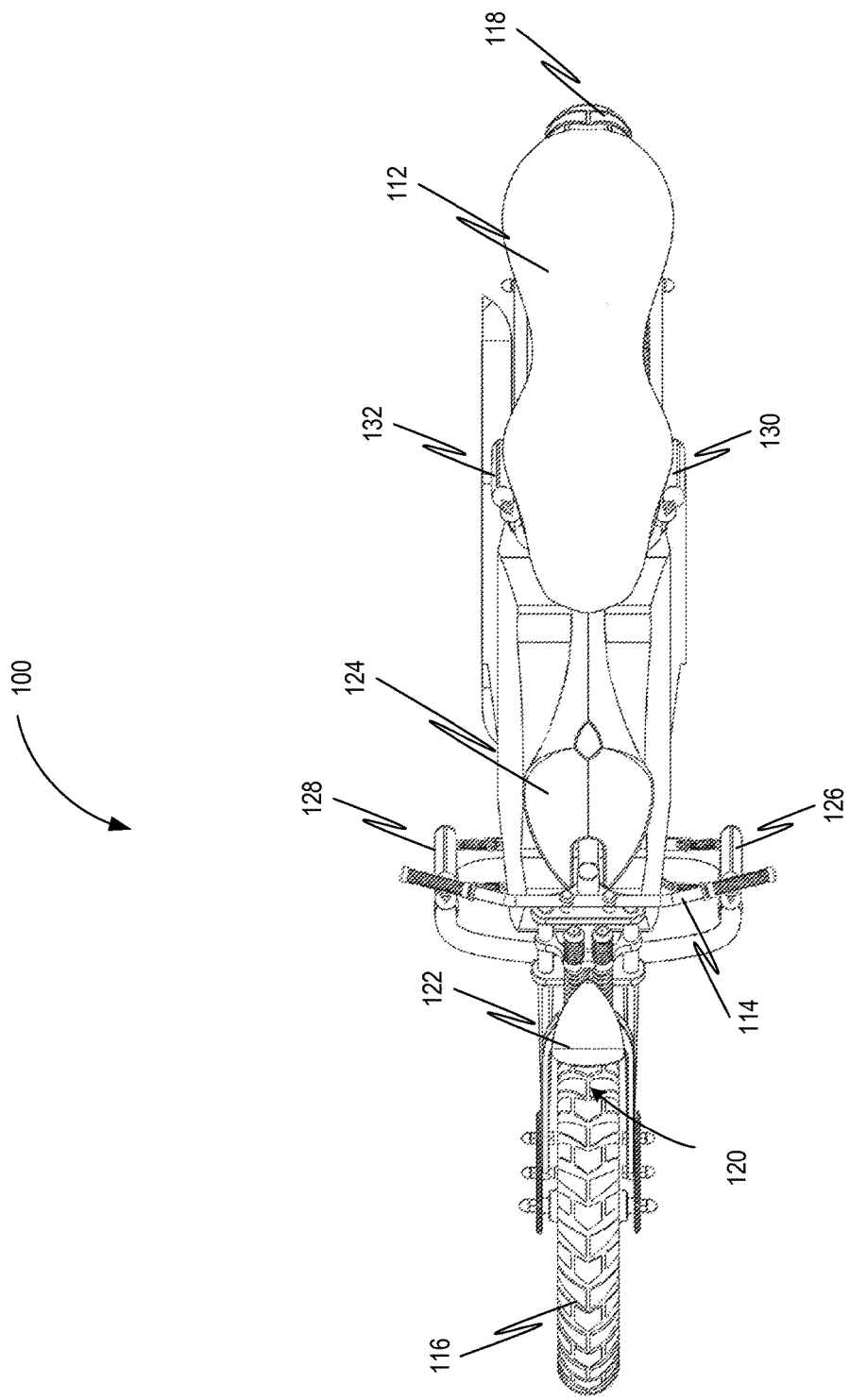
FIG. 5 is a top view of the two-wheeler vehicle in FIG. 1.
Figure 6:
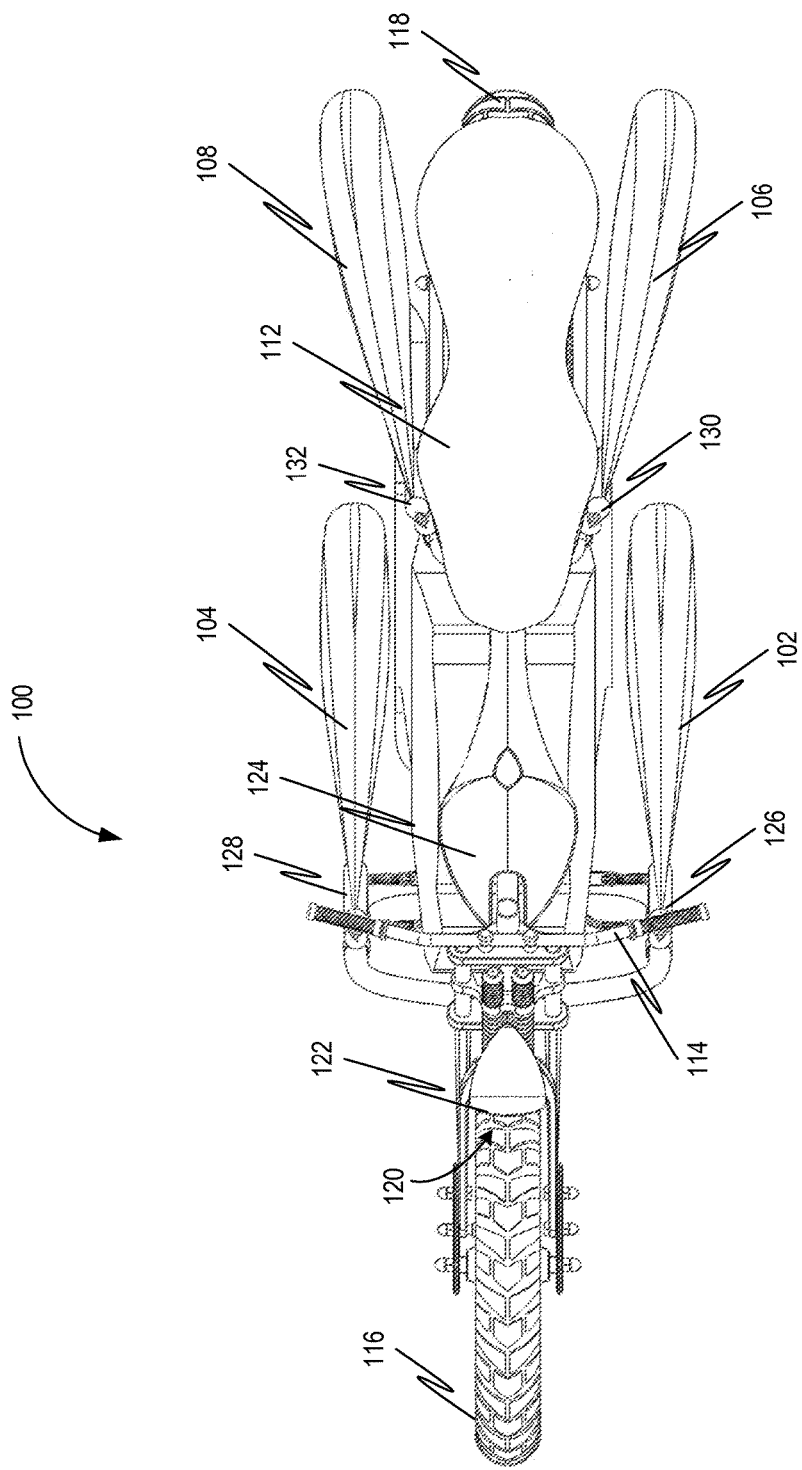
FIG. 6 is a top view of the two-wheeler vehicle in FIG. 1, when the airbag of the embodiment is fully deployed.
Figure 7:
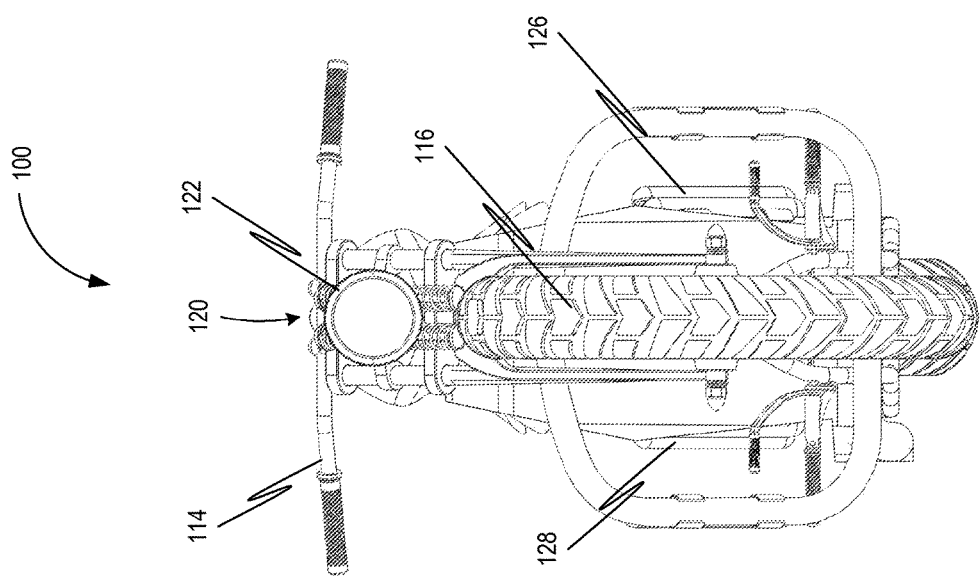
FIG. 7 is a front view of the two-wheeler vehicle in FIG. 1.
Figure 8:
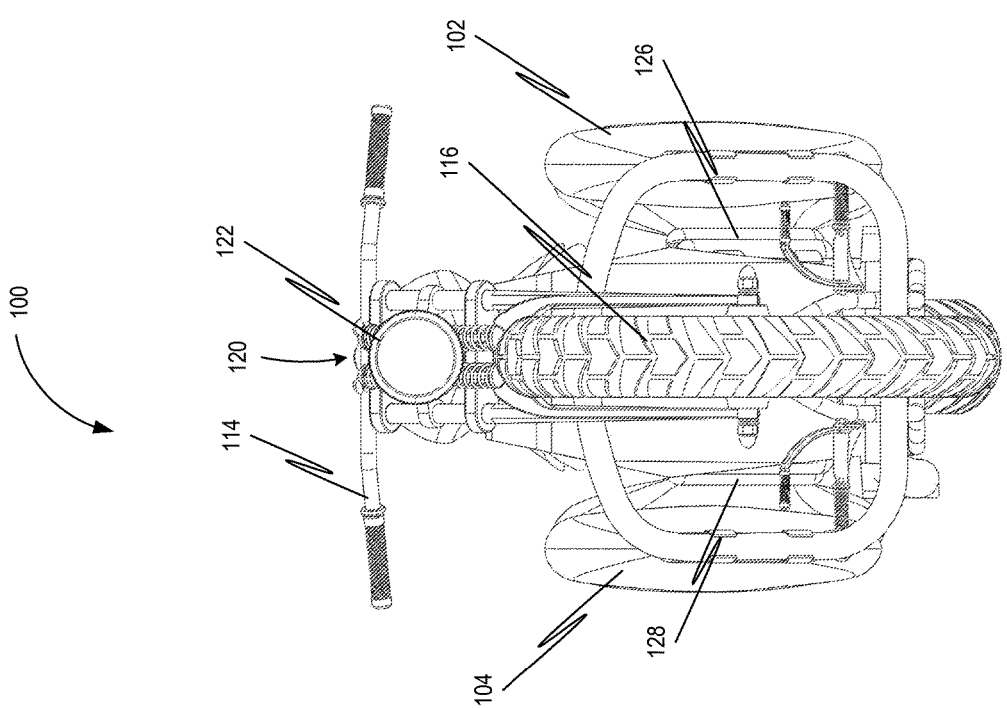
FIG. 8 is a front view of the two-wheeler vehicle in FIG. 1, when the airbag of the embodiment is fully deployed.

FIGS. 3 and 4 show a side view of the two-wheeler vehicle 100. FIGS. 5 and 6 show a top view of the two-wheeler vehicle 100. FIGS. 7 and 8 show a front view of the two-wheeler vehicle 100.

The retainer 126 (and the front airbag 102) is mounted near left leg of a rider of the two-wheeler vehicle 100 and the retainer 128 (and the front airbag 104) is mounted near right leg of a rider of the two-wheeler vehicle 100. For example, each of the front airbags 102-104 is mounted near each shin of the rider respectively. Further, the front airbags 102-104 may be mounted on a front safety bar of the two-wheeler vehicle 100. Similarly, the retainer 130 (and the rear airbag 106) is mounted near left leg of a pillion rider of the two-wheeler vehicle 100 and the retainer 132 (and the rear airbag 108) is mounted near right leg of the pillion rider of the two-wheeler vehicle 100.

Figure 9:
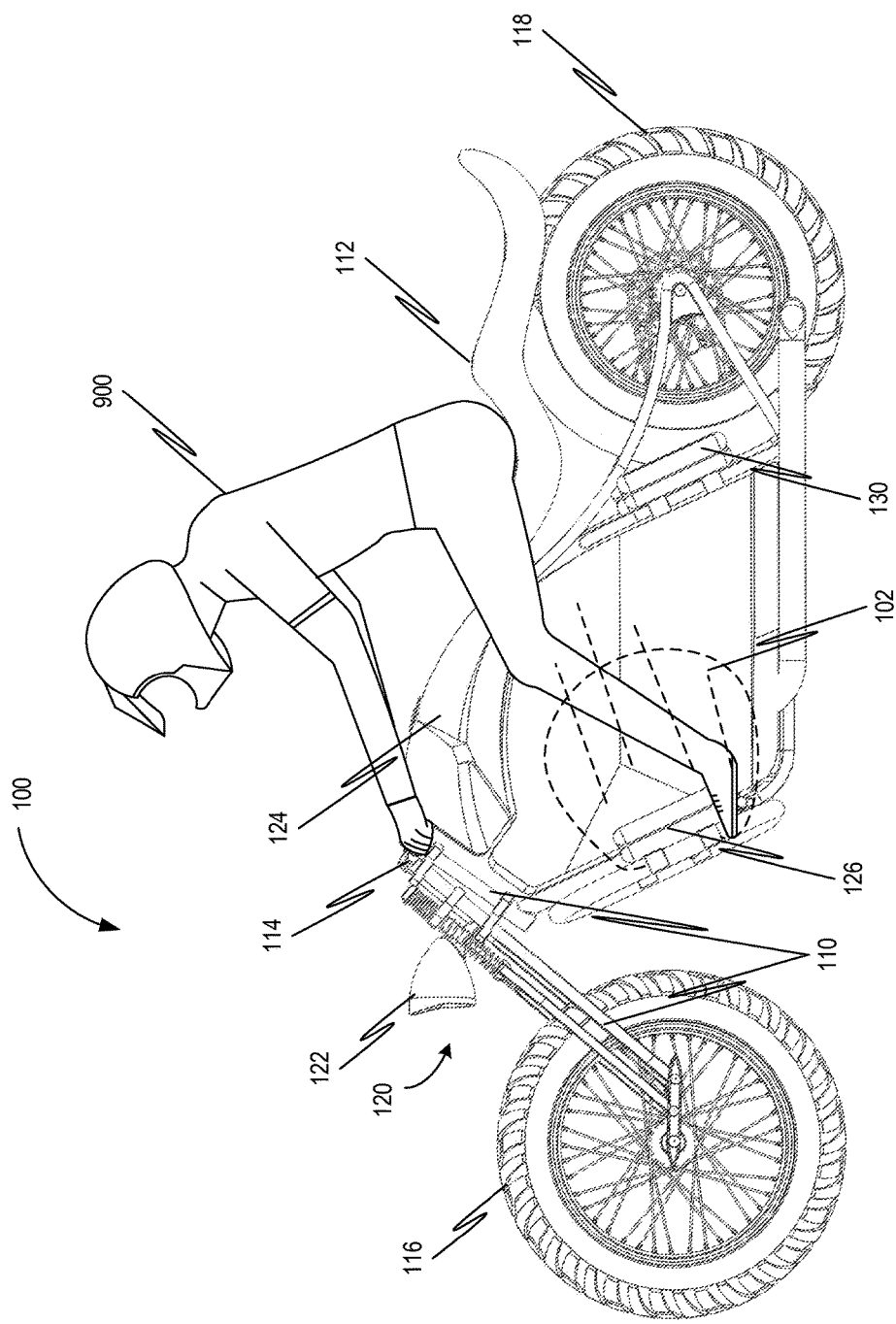
FIG. 9 is a side view of the two-wheeler vehicle in FIG. 1, when an airbag of the embodiment is fully deployed.

When the front airbags 102-104 are deployed they protect the knees, legs and feet of a rider 900 as shown in FIG. 9. When the rear airbags 106-108 are deployed they protect the knees, legs and feet of a pillion rider (not shown). Accordingly, size, shape and volume of the airbags 102-108 is selected such that when the airbags are deployed the knees, legs and feet of one of the rider and the pillion rider are totally protected. For example, the airbags 102-108 may be fin shaped. Further, suitable webbings, straps, belts or like may be used to ensure that the airbags 102-108 deploy properly to restrain and protect the knees, legs and feet of the rider and the pillion rider.

The airbags 102-108 are deployed during emergency conditions, which include a collision of the two-wheeler vehicle 100 or tilt of the two-wheeler vehicle 100 exceeding a critical angle. The collision broadly includes the two-wheeler vehicle 100 colliding with an object (for example, other vehicles, pedestrians, obstacles, or guardrails). Tilting of the two-wheeler vehicle 100 includes the rider banking the two-wheeler vehicle 100 while turning the two-wheeler vehicle 100 around a corner and the rider losing the balance of the two-wheeler vehicle 100 leading to the two-wheeler vehicle 100 falling on one side. The critical angle depends on the characteristics of the two-wheeler vehicle 100 and the road surface.

Further, the two-wheeler vehicle 100 includes one or more inflators configured to supply inflation gas to the airbags 102-108. The airbags 102-108 are in a folded state before deployment. The inflation gas from the one or more inflators deploys the one or more airbags 102-108. An inflator further includes a trigger mechanism and a cartridge to release inflation gas. The cartridge is one of a gas cartridge storing compressed gas and a chemical cartridge storing one or more chemicals capable of generating gas through a chemical reaction. An inflator may be housed in each airbag, wherein the inflator supplies the inflation gas directly into the corresponding airbag. Alternatively, an inflator is connected to one or more airbags through a gas supply passage and the inflator indirectly supplies the inflation gas into the one or more airbags through the gas supply passage.

Yet further, the two-wheeler vehicle 100 includes one or more sensors that activate the one or more inflators by closing an electrical circuit, wherein an electric signal is used to ignite a chemical reaction in a chemical cartridge to generate gas or release compressed gas from a gas cartridge that inflates the one or more airbags 102-108. The one or more sensors configured to track one or more safety parameters of the two-wheeler vehicle 100 and generate a trigger signal, when a predetermined threshold of the one or more safety parameters is reached. In an embodiment, the one or more sensors include a tilt sensor that activates the one or more inflators, when a tilt of the two-wheeler vehicle 100 exceeds a predetermined threshold (a critical angle). The one or more front airbags 102-104 and the one or more rear airbags 106-108 are inflated based on the direction of tilt determined by the tilt sensor. Further, the one or more sensors further include an impact sensor that detects a collision and activates the one or more inflators, when a detection value of the impact sensor is greater than a threshold value. All airbags 102-108 are inflated when the impact sensor detects a collision. Moreover, the one or more inflators may be deactivated to prevent any accidental activation during vehicle servicing.

System Block Diagram

Figure 10:
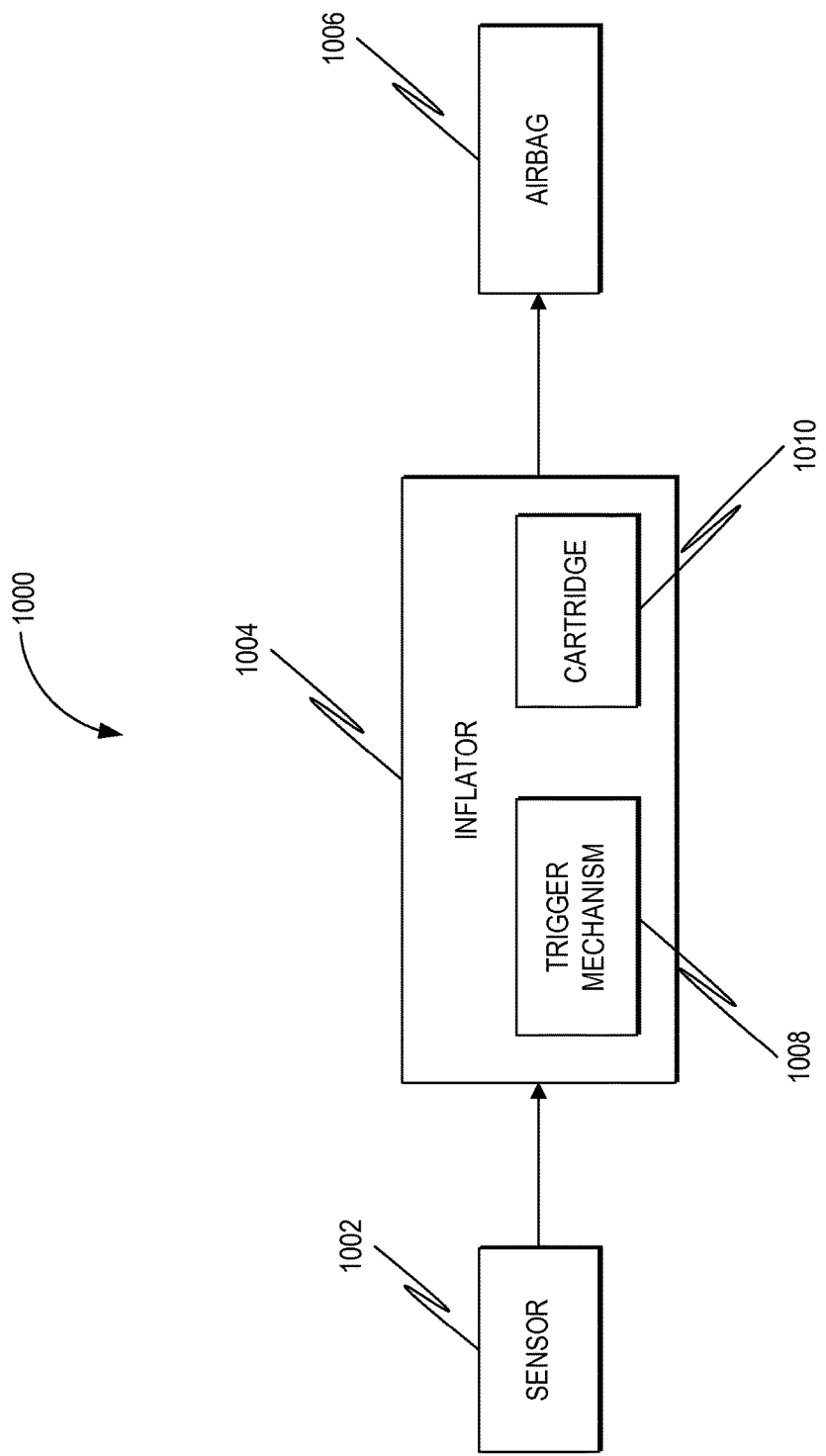
FIG. 10 is a block diagram an airbag system according to an embodiment of the invention.

Referring to FIG. 10, the airbag system 1000 of an embodiment is mainly composed of one or more sensors 1002, one or more inflators 1004, and one or more airbags 1006. The one or more sensors 1002 include a tilt sensor, an impact sensor, a pressure sensor and other similar sensors. In the event of a skidding or impact, the one or more sensors 1002 detect the emergency condition. For example, the tilt sensor detects when the tilt angle of the two-wheeler vehicle 100 is more than the critical angle and the impact sensor detects when an impact is beyond normal limits. When an emergency condition is detected, the one or more sensors 1002 send a trigger signal to the one or more inflators 1004. Each inflator in the one or more inflators 1004 includes a trigger mechanism 1008 and a cartridge 1010, wherein the cartridge 1010 is one of a gas cartridge storing compressed gas and a chemical cartridge storing one or more chemicals capable of generating gas through a chemical reaction. For example, a gas cartridge may store carbon dioxide ($CO_2$) in liquid form and a chemical cartridge may store chemicals Potassium Nitrate ($KNO_3$) and Sodium Azide ($NaN_3$) which on chemically reacting release $CO_2$. The one or more airbags 1006 are the airbags 102-108.

Various configurations of the one or more sensors 1002, the one or more inflators 1004 and the one or more airbags 1006 may be employed. In an example embodiment, there is one set of the one or more sensors 1002 and one inflator 1004 for each airbag in the one or more airbags 1006. In this embodiment, there are four sets of the one or more sensors 1002 and four inflators. Accordingly, the one or more sensors 1002 send a trigger signal to the relevant inflator which then inflates the associated airbag. In an alternate embodiment, the two-wheeler vehicle 100 includes one central set of sensors 1002 and one central inflator 1004, wherein the central set of sensors 1002 sends a trigger signal to the central inflator 1004 which then inflates the relevant airbag via a gas supply passage (a gas duct). In another embodiment, the two-wheeler vehicle 100 includes one central set of sensors 1002. Further it includes one inflator 1004 for each airbag, wherein the central set of sensors 1002 sends a trigger signal to the relevant inflator 1004 which then inflates the corresponding airbag directly. In a yet another embodiment, the two-wheeler vehicle 100 includes one central set of sensors 1002. Further it includes one inflator 1004 for each side of the vehicle (that is, one inflator for the left side of the vehicle and one inflator for the right side of the vehicle), wherein the central set of sensors 1002 sends a trigger signal to the relevant inflator on one of the left side and right side of the two-wheeler vehicle 100, which then inflates the two airbags on the corresponding side of the two-wheeler vehicle 100 directly.

Further, when a tilt sensor indicates that the two-wheeler vehicle 100 has tilted more that a predetermined threshold (critical angel) towards the left side, then only the left side airbags (the airbags 102 and 106) are deployed to protect the rider and the pillion rider. Similarly, when the tilt sensor indicates that the two-wheeler vehicle 100 has tilted more that a predetermined threshold towards the right side, then only the right side airbags (the airbags 104 and 108) are deployed to protect the rider and the pillion rider. However, when an impact sensor detects a collision, then all airbags 102-108 are deployed. Yet further, the seat 112 may include a pressure sensor to detect a pillion rider. Accordingly, the rear airbags 106 and 108 are deployed in emergency situations only if a pillion rider is detected by the pressure sensor.

Figure 11:
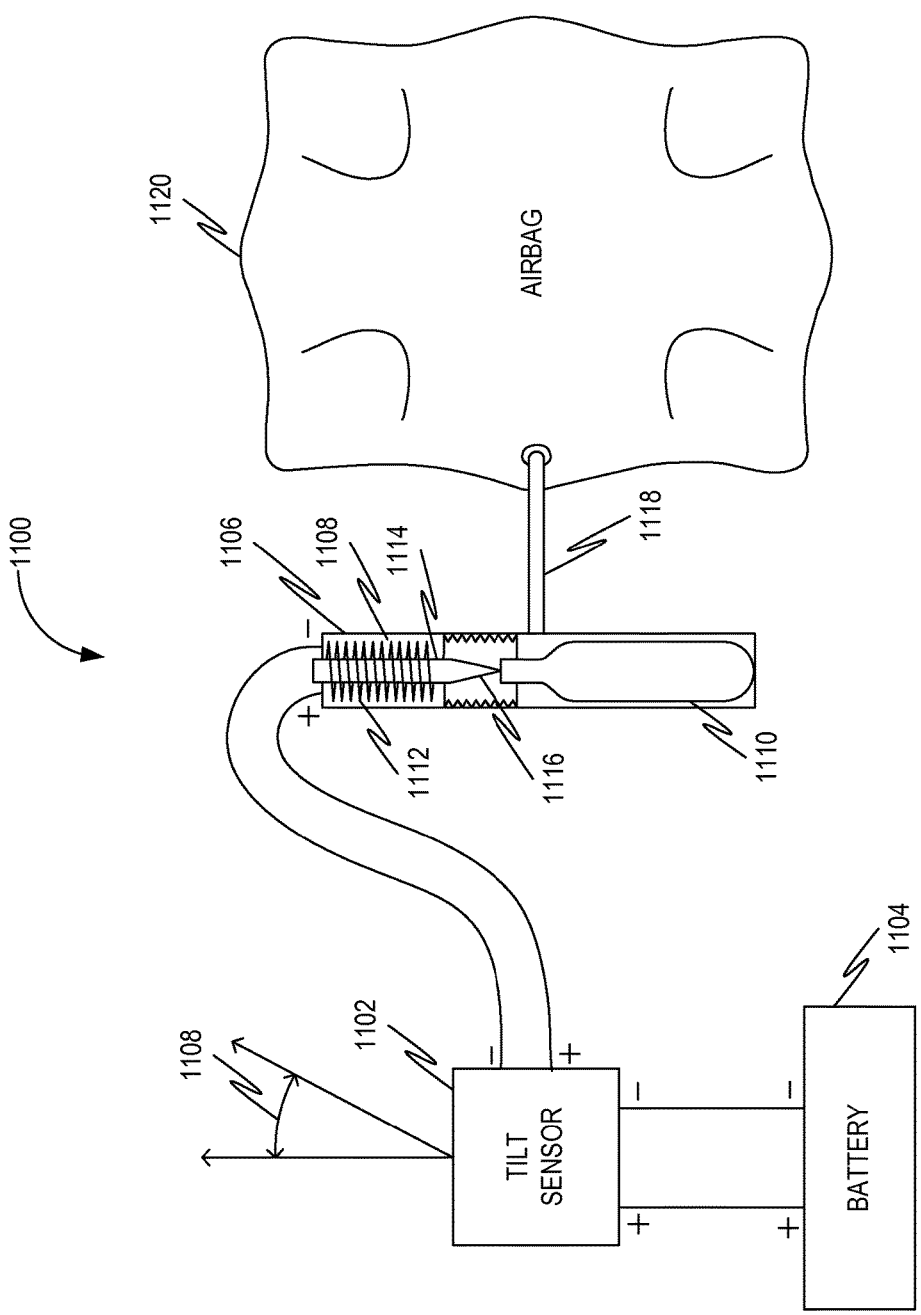
FIG. 11 illustrates exemplary method steps for deployment of the airbag system according to an embodiment of the invention.

FIG. 11 shows an airbag system 1100 according to an exemplary embodiment of present disclosure. The airbag system 1100 includes a tilt sensor 1102 connected to a battery 1104. The battery 1104 may be the main battery of the two-wheeler vehicle 100. The tilt sensor 1102 activates an inflator 1106, when a tilt of the two-wheeler vehicle 100 exceeds a predetermined threshold. The predetermined threshold is a critical angle 1108. The critical angle 1108 depends on the characteristics of the vehicle and the road surface. The inflator 1106 includes a trigger mechanism 1108 and a cartridge 1110. The trigger mechanism 1108 includes a coil 1112, which moves a solenoid core 1114 when the trigger mechanism 1108 is activated by the tilt sensor 1102. The solenoid core 1112 further has a punch tip 1116, which when moved punctures the cartridge 1110. The cartridge 1110 contains compressed carbon dioxide. The released carbon dioxide moves through an air duct 1118 to inflate the airbag 1120.

Methods

Figure 12:
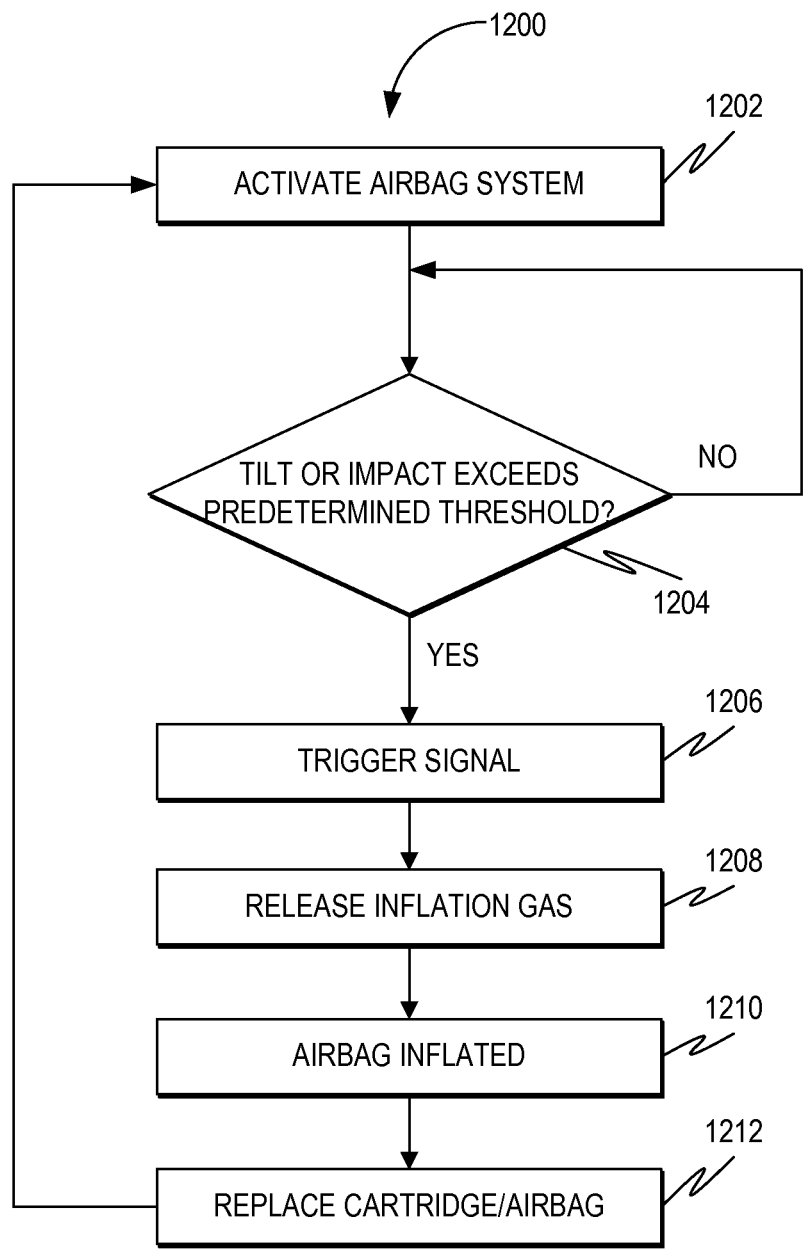
FIG. 12 is a flow chart of a method of the invention.

Referring now to FIG. 12, a flow chart of a method 1200 that may be incorporated into some embodiments of the present invention. The method steps are presented as exemplary and are not required to be executed in a particular order. At step 1202, the airbag system 1000 is activated. The airbag system 1000 is activated when the ignition switch of the two-wheeler vehicle 100 is switched on. There may be an additional switch to switch on/off the airbag system 1000. The additional switch is also used to deactivate the airbag system 1000 (or the inflator 1004) to prevent any accidental activation during vehicle servicing.

Then, at step 1204, the sensor 1002 is configured to detect and determine an emergency condition which includes detecting an impact or a tilt more than a predetermined threshold. When the sensor 1002 detects an emergency condition, the sensor 1002 sends a trigger signal that closes an electrical circuit at step 1206. The trigger signal activates the trigger mechanism 1008 which releases inflation gas from the cartridge 1010 at step 1208. The inflation gas inflates the airbag 1006 at step 1210. The trigger signal is an electric signal that can be used to ignite chemical reaction when a chemical cartridge is used or to puncture a cartridge when a gas cartridge is used. The time between sending the trigger signal and the two-wheeler vehicle 100 completely falling is utilized to completely deploy the relevant airbags to provide a cushion for the leg, knee and feet of the rider and the pillion rider.

Once an airbag is inflated, the cartridge 1010 needs to be replaced. Further, airbag may be damaged as it protects the rider and the pillion rider. The cartridge 1010 and airbag are replaced at step 1212 and the method 1200 goes back to step 1202.

A number of embodiments of the present invention have been described. Nevertheless, it will be understood that various modifications may be made without departing from the spirit and scope of the invention. For example, various methods or equipment may be used to implement the process steps described herein or to create a device according to the inventive concepts provided above and further described in the claims. In addition, various integration of components, as well as software and firmware may be implemented. Accordingly, other embodiments are within the scope of the following claims.

What is claimed is:

1. An airbag apparatus for a two-wheeler vehicle, the airbag apparatus comprising:
   a. a plurality of front airbags mounted on the two-wheeler vehicle configured to be near each leg of a rider of the two-wheeler vehicle, wherein the plurality of front airbags corresponds to a left side and a right side of the vehicle, wherein at least one front airbag of the plurality of front airbags is configured to be deployed and inflated for protecting the knees, legs and feet of the rider on one of the left side and the right side of the two-wheeler vehicle during emergency conditions;
   b. a plurality of rear airbags mounted on the two-wheeler vehicle configured to be near each leg of a pillion rider of the two-wheeler vehicle, wherein the plurality of rear airbags corresponds to the left side and the right side of the vehicle, wherein at least one rear airbag of the plurality of rear airbags is configured to be deployed and inflated for protecting the knees, legs and feet of the pillion rider on one of the left side and the right side of the two-wheeler vehicle during emergency conditions;
   c. at least one selected inflator configured to supply inflation gas to the at least one front airbag and the at least one rear airbag when activated, wherein each of the at least one front airbag and the at least one rear airbag corresponds to only one of the left side and the right side of the two-wheeler vehicle;
   d. at least one tilt sensor configured to determine a direction of tilt and a critical angle of tilt of the two-wheeler vehicle and produce a trigger signal to activate the at least one selected inflator selected based upon a direction of tilt registered by the tilt sensor and the tilt sensor exceeding a predetermined threshold critical angle;

e. wherein the at least one front airbag is mounted on either sides of the two-wheeler vehicle configured to be next to the rider's shin; and
f. wherein the at least one rear airbag comprises a fin shape mounted on either side of the two-wheeler vehicle is configured to be next to the pillion rider's shin and configured to protect knees, legs and feet of the rider when deployed.

2. The airbag apparatus of claim 1 wherein the at least one front airbag and the at least one rear airbag is mounted on the frame of the two-wheeler vehicle.

3. The airbag apparatus of claim 1 wherein the at least one front airbag and the at least one rear airbag is shaped and sized such that a fully inflated airbag shields the knees, legs and feet of one of the rider and the pillion rider.

4. The airbag apparatus of claim 1, wherein the at least one inflator includes a trigger mechanism and one of a gas cartridge storing compressed gas and a chemical cartridge storing one or more chemicals capable of generating gas through a chemical reaction.

5. The airbag apparatus of claim 1, the at least one sensor is a tilt sensor that activates the at least one inflator, when a tilt of the two-wheeler vehicle measured by the tilt sensor exceeds a threshold dependent upon characteristics of a road surface.

6. The airbag apparatus of claim 5, wherein the at least one front airbag and the at least one rear airbag is inflated based on the direction of tilt determined by the tilt sensor that is dependent upon characteristics of the two wheeler vehicle.

7. The airbag apparatus of claim 6, the at least one sensor includes an impact sensor that detects a collision and activates the at least one inflator, when a detection value of the impact sensor is greater than a predetermined threshold indicating a collision of the two wheeler vehicle with an object comprising one of: another vehicle, a pedestrian, an obstacle and a guardrail.

8. The airbag apparatus of claim 7, wherein all airbags in the at least one front airbag and the at least one rear airbag are inflated when the impact sensor detects a collision.

9. The airbag apparatus of claim 8, wherein the at least one sensor activates the at least one inflator by sending a trigger signal, wherein the trigger signal is an electric signal used to ignite a chemical reaction in a chemical cartridge to generate gas or to release compressed gas in a gas cartridge that inflates at least one of the at least one front airbag and the at least one rear airbag.

10. The airbag apparatus of claim 9, wherein the at least one inflator may be deactivated to prevent activation during vehicle servicing.

11. A method to deploy an airbag for a two-wheeler vehicle, the two-wheeler vehicle comprising a plurality of front airbags mounted on the two-wheeler vehicle configured to be near each leg of a rider of the two-wheeler vehicle and a plurality of rear airbags mounted on the two-wheeler vehicle configured to be near each leg of a pillion rider of the two-wheeler vehicle, wherein each of the plurality of front airbags and the plurality of rear airbags corresponds to a left side and right side of the two-wheeler vehicle, the method comprising:
a. detecting an emergency condition, using at least one sensor configured to track at least one safety parameter comprising:
a critical angle of the two-wheeler vehicle based upon characteristics of the two-wheeler vehicle, and a direction of tilt;
b. sending a trigger signal, when a predetermined threshold critical angle in the direction of tilt is reached;
c. activating at least one inflator configured to supply inflation gas to at least one of at least one front airbag of the plurality of front airbags and at least one rear airbag of the plurality of rear airbags when the trigger signal is received, wherein each of the at least one front airbag and the at least one rear airbag corresponds to a direction of tilt and comprising only one of the left side and the right side of the two-wheeler vehicle;
d. deploying at least one of the at least one front airbag and the at least one rear airbag; wherein the at least one rear airbag to be deployed and inflated for protecting the knees, legs and feet of the pillion rider on one of the left side and the right side of the two-wheeler vehicle during emergency conditions, wherein the at least one front airbag to be deployed and inflated for protecting the knees, legs and feet of the rider on one of the left side and the right side of the two-wheeler vehicle during emergency conditions; and
e. forming at least one of the at least one front airbag and the at least one rear airbag is fin shaped and mounted on the frame of the two-wheeler vehicle, wherein at least one of the at least one front airbag and the at least one rear airbag is shaped and sized so that a fully inflated airbag ins configured to shield the knees, legs and feet of at least one of the rider and the pillion rider.

12. The method of claim 11, wherein the at least one inflator includes a trigger mechanism and one of a gas cartridge storing compressed gas and a chemical cartridge storing one or more chemicals capable of generating gas through a chemical reaction.

13. The method of claim 12, wherein the at least one sensor is a tilt sensor that activates the at least one inflator, when a tilt of the two-wheeler vehicle exceeds a predetermined threshold, wherein the at least one front airbag and the at least one rear airbag is inflated based on the direction of tilt determined by the tilt sensor and the characteristics of a road surface.

14. The method of claim 13, wherein the at least one sensor includes an impact sensor and the method further detecting a collision; and activating all airbags based upon the impact sensor detecting a collision.

15. The method of claim 14, wherein the at least one sensor activates the at least one inflator by sending a trigger signal, wherein the trigger signal is an electric signal used to ignite a chemical reaction in a chemical cartridge to generate gas or to release compressed gas in a gas cartridge that inflates at least one of the at least one front airbag and the at least one rear airbag.

16. An airbag apparatus for a two-wheel vehicle, the airbag apparatus comprising:
a. a left front airbag and a right front airbag, mounted to a frame of the two-wheel vehicle, on a left side and a right side of the two-wheel vehicle respectively, and positioned to protect knees, legs and feet of a driver of the two-wheel vehicle when the left front airbag and the right front airbag are deployed;
b. a left rear airbag and a right rear airbag, mounted to a frame of the two-wheel vehicle, each fin shaped and mounted on a left side and a right side of the two-wheel vehicle respectively, and positioned to protect knees, legs and feet of a pillion rider of the two-wheel vehicle when the left rear airbag and the right rear airbag deployed;
c. an inflator device configured in an activated state to supply inflation gas to one or more of the left front airbag, the right front airbag, the left rear airbag or the right rear airbag, the inflator device comprising one of one of: a gas cartridge storing compressed gas and a chemical cartridge storing one or more chemicals capable of generating gas through a chemical reaction;

d. a tilt sensor configured to determine a direction of tilt and a critical angle of tilt of the two wheeled vehicle and produce a trigger signal to activate the inflator device and thereby supply gas to a selected airbag based upon a direction of tilt registered by the tilt sensor and the tilt sensor exceeding a predetermined threshold critical angle of tilt of the two wheeled vehicle, wherein the threshold critical angle may be based upon characteristics of a road surface and the two-wheel vehicle;

e. an impact sensor for detecting a collision and deploying each inflator via activation when a detection value of the impact sensor is greater than a predetermined threshold indicating a collision of the two wheel vehicle with an object comprising one of: another vehicle, a pedestrian, an obstacle and a guardrail; and f. a deactivation device deactivating the inflator during service of the two-wheel vehicle.

\* \* \* \* \*